Feb. 12, 1946. A. C. CHESTER 2,394,749
PROPELLER SPINNER ATTACHING DEVICE
Filed May 27, 1944
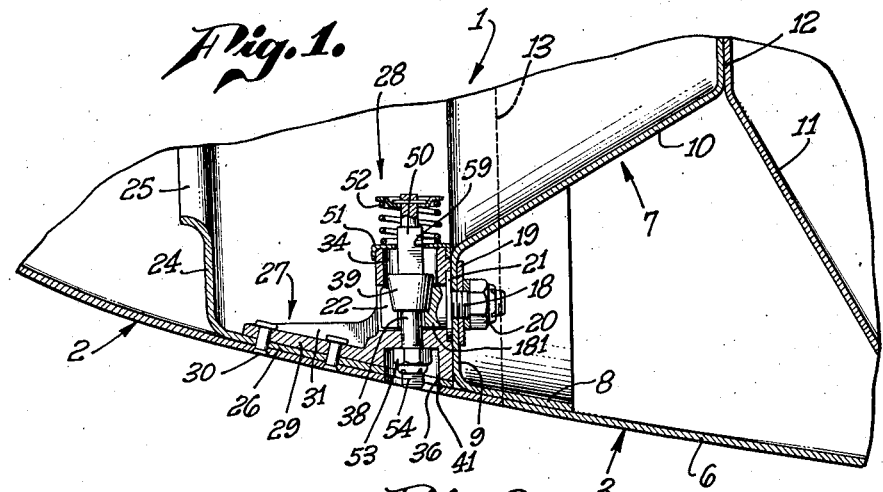
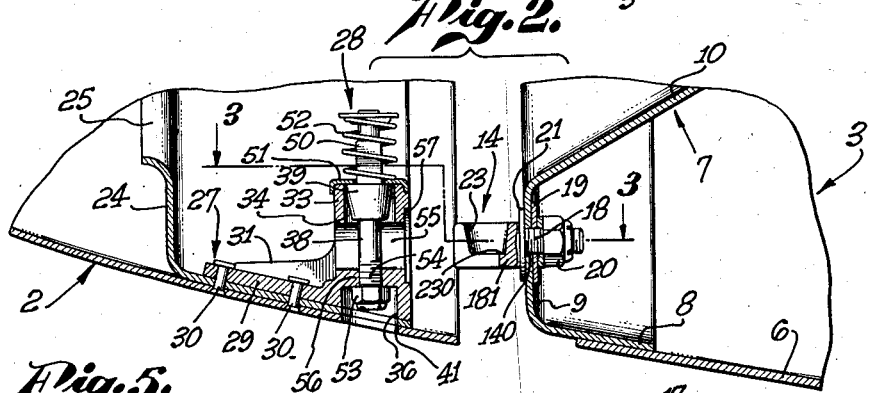
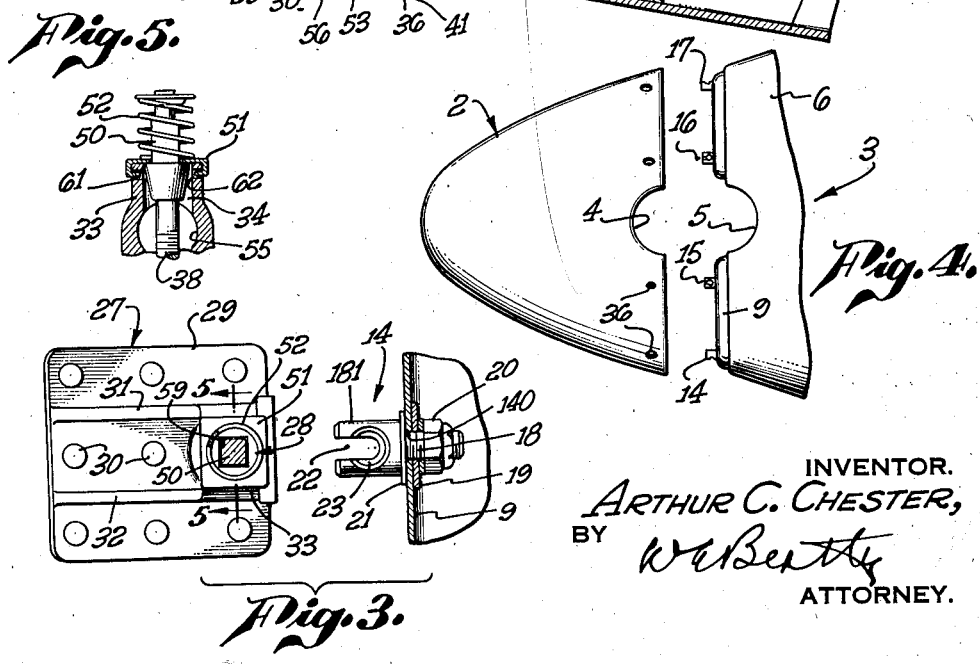
INVENTOR.
ARTHUR C. CHESTER,
BY
ATTORNEY.

Patented Feb. 12, 1946

2,394,749

UNITED STATES PATENT OFFICE 2,394,749

PROPELLER SPINNER ATTACHING DEVICE

Arthur C. Chester, Los Angeles, Calif.

Application May 27, 1944, Serial No. 537,713

6 Claims. (Cl. 170—159)

It has heretofore been proposed to employ a spinner, that is a hollow streamline body, over the hub of the propeller of an aircraft. However, the means for attaching the spinner in position on the propeller has made it rather difficult to either assemble the spinner, or to take it apart in case that access to the hub of the propeller is necessary. This is particularly difficult with certain types of planes.

The invention relates to an improvement in an attaching device for sections such as spinner sections and has for an object to increase the facility with which the sections may be assembled or disassembled. More particularly, an object of the invention is to make it possible to lock spinner sections from the exterior of the spinner without making it necessary to gain access to the interior of the spinner as heretofore, particularly where a lock nut is employed to lock the sections. Such lock nuts may cease to function as a lock nut when they become coated with oil from the propeller shaft, and the invention facilitates replacing such oil-coated lock nuts with clean ones.

For further details of the invention reference may be made to the drawing wherein Fig. 1 is a sectional view, with parts broken away, of the spinner attaching device of this invention, showing the front spinner section attached to the rear spinner section.

Fig. 2 is a sectional view corresponding to Fig. 1, but with the attaching device disconnected and the front and rear spinner sections separated.

Fig. 3 is a plan view with parts broken away of the attaching device as it appears when the front and rear spinner sections are separated.

Fig. 4 is a view either in plan or elevation, in reduced scale, of the two spinner sections separated and having the attaching device of this invention.

Fig. 5 is a partial sectional view on line 5—5 of Fig. 3 of a bracket detail.

Referring in detail to the drawing, the spinner 1 comprises a front section 2 and a rear section 3 which are metal streamline bodies to be fastened together and having several cutaway portions such as 4 and 5 to accommodate the blades of the propeller. The sections 2 and 3 are hollow streamline bodies, the rear section 3 being imperforate so far as concerns apertures to gain access to a device to lock the two sections together. Rear section 2 at the right end thereof, not shown, terminates in a plane at right angles to the spinner axis, and that right end merges with the streamline of the cowling.

The rear section 3 comprises a shell 6 inside of which is a web 7 having a flange 8 which fits and extends around the inside of the left end of shell 6 as shown in Figs. 1 and 2. The flange 8 is spotwelded to the shell 6 and projects beyond the end of shell 6 where it has a flat portion 9 which extends in a plane at right angles to the spinner axis and forms a base for a part of the attaching device of this invention. The base 9 is depressed adjacent the cut-away portion 5 to fit around the propeller blade. The base 9 slopes inwardly as indicated at 10 where it meets another web 11, as indicated at 12 where these webs are welded together. The web 11 continues to the rear of shell 3 and has a flanged portion not shown extending around and fitting the inside thereof and welded thereto.

The front section 2 and rear section 3 meet and fit on the flange 8, the parting line being indicated at 13 in Fig. 1.

Mounted on the base 9, which in effect forms an end wall portion of the section 3, is an array of bifurcated studs, one of which is shown at 14 in Fig. 2, and others are indicated at 15, 16 and 17 in Fig. 4. Preferably there is a pair of studs such as 14, 15 for each propeller blade.

As shown in Fig. 2, the studs such as 14 are mounted in apertures such as 140 in base 9 and extend generally along the spinner axis. Studs 14, etc., have a threaded portion 18 having suitable washers 19, and lock nut 20 at one side of the base 9. At the other side of base 9 the studs 14, etc., have an integral flange 21 provided on its inner face with serrations not shown to cut into flange 9 and prevent the studs 14, etc., from turning. Studs 14, etc., also have an enlarged head 181 with a slot or bifurcation 22 shown in Fig. 3, and with an inwardly facing conical or tapered portion 23 conjoining or opening into the slot 22. The bottom of slot 23 has a shoulder 230 to limit locking engagement of bolt 38. The axis of each of the tapered portions 23 in the various studs such as 14 extends radially with respect to the spinner axis.

The front section 2 is reinforced by a web 24 having a central aperture 25 through which projects an extension of the propeller shaft, that extension centering in a bearing not shown inside the nose of the front section 2.

The web 24 has a flange 26 which fits around the inside of the right end of the front section 2, as shown in Figs. 1 and 2. The flange 26 is spotwelded to the end of the section 2.

Arranged inside of and adjacent the end of the front section 2 is an array of brackets 27 each carrying a locking device 28 which is a companion for one of the studs 14, etc. The bracket 27 has a base 29 which fits on and is riveted to the flange 26 as indicated at 30. Bracket 27 has two spaced ribs 31, 32 which merge with a cross-piece 33 having at its inner end an aperture or recess 34 to receive the head 39 of cam bolt 38. Inwardly projecting from head 39 is a stem 50 which slides in cap 51. Between the outer end of stem 50 and cap 51 is a compression spring 52 to urge bolt 38 to unlocked position, shown in Fig. 2. The base of the bracket 27 and section 2 are provided with an outer aperture or recess 36 to house lock nut 53 on the threaded shank 54 of bolt 38. The head 131 of the stud 14 fits in the intermediate recess 55 in cross-piece 33, the recess 55 being cylindrical, as shown in Fig. 5, and the head 131 of stud 14 having a cylindrical periphery except where it is cut away to provide the slot 22 for the tapered portion 23. The shank 54 slides in web 56 between recesses 36 and 55. Bracket 27 has a recess 57 to receive flange 21.

The head 39 of bolt 38 is provided with an outwardly facing tapered portion which fits the tapered portion 23 in the stud 14. Also the slot 22 is wide enough to receive the shank of the bolt 38. The front section 2 and the web 24 have an aperture 41 which aligns with the aperture 36 in the bracket 27, so that access to the lock nut 53 of bolt 38 may be had from the exterior of the front section 2.

When the spinner sections 2 and 3 are separated, the attaching device cannot be misplaced because the studs such as 14 are fixed to the rear section 3 and the companion locking bolts such as 38 are movable in but not removable from the front section 2. The end of shank 54 projects out from web 56 when nut 53 is removed, as cap 51 limits the inward movement of bolt 38.

When it is desired to attach the two sections 2 and 3 together about the propeller, these two sections are placed on opposite sides of the propeller with each pair of cutaway portions 4 and 5 in line with a propeller blade and with the studs such as 14 lined up with their corresponding lock bolts such as 38. The two sections 2 and 3 are then fitted together as shown in Fig. 1, the slot 22 passing over the shank of the bolt 38, the bolt 38 at this time being retracted by spring 52 to the position shown in Fig. 2, the studs 14 fitting in the recess 55. Then the lock nut 53 is screwed in and the tapered or conical portion 23 acts as a cam or wedge to pull the two sections 2 and 3 together longitudinally.

When the lock nut 53 is screwed onto or off from the threaded shank 54, the latter is prevented from turning by reason of the fact that the stem 50 is square or other non-circular shape and slidingly fits in a mating square or other non-circular aperture 59 in the cap 51, as indicated in Fig. 3, also Figs. 1, 2 and 5. The bolt 38, cap 51 and spring 52 are assembled in the bracket 28 and retained in the position shown in all figures, by means of tongues or fingers such as shown at 61 in Fig. 5 on cap 51, each of the tongues 61 being bent into an aperture such as 62 in the top of the cross-piece 33.

When it is desired to unfasten the two sections, the nuts such as 53 are unscrewed until the tapered portion 39 is withdrawn by spring 52 from tapered portion 23 into recess 34, and then the slot 22 will pass the shank of bolt 38 and permit sections 2 and 3 to be separated.

It will therefore be apparent that I have provided a spinner attaching device which is simple in operation, which is effective to properly align the two sections together, wherein the parts of the attaching device cannot be misplaced, and wherein the lock nuts for the attaching device are accessible from the exterior of the spinner.

Various modifications may be made in the invention without departing from the spirit of the following claims.

I claim:

1. In a device having cover and casing sections fitting together, means for attaching said sections, said means comprising fixed bifurcated cam studs extending axially beyond the front end of said casing section, said cam studs each having a conical recess and companion radially slidable cam bolts inside said cover section in position to engage said studs, each of said bolts having a conical head fitting in one of said conical recesses, means supporting said bolts for sliding non-rotary movement, locking means for each of said bolts, spring means urging said bolts out of locking engagement, said cover section having apertures housing said locking means inside of the cover section while permitting access to said locking means.

2. In a device having circular sections having an axis and fitting together, means for attaching said sections, said means comprising a circular array of studs each having an inwardly facing conical surface conjoining a bifurcation, one of said sections having an end wall portion extending in a direction across the axis, means securing each of said studs projecting outwardly from said end wall with the axis of each conical surface radial of the section axis, a corresponding array of movable cam bolts, each having a threaded end, means secured to the other section supporting each of said bolts for radial locking and unlocking movement of the bolt wholly inside of its section, each of said bolts having a shank smaller than said bifurcation and having an outwardly facing conical cam surface fitting the conical surface of said studs, spring means urging the conical surface of each of said bolts inwardly out of engaging position with its corresponding conical stud surface, a nut for drawing each of said bolts outwardly, said other section having an aperture extending inwardly from its outer surface for housing the threaded end and lock nut of each of said bolts within the section while permitting access thereto from the exterior of the section.

3. Attachment means for a device having cover and casing sections, said means comprising an array of brackets inside of and secured to said cover section, each of said brackets having an outer bore, a cam bolt for each bracket, each cam bolt having a threaded shank slidable in the bore of its bracket for radial movement with the shank of the bolt out, a lock nut for each of said shanks, each of said brackets having an outer recess for one of said lock nuts and also having an intermediate recess, cam studs fixed to and extending lengthwise of said casing section and each fitting one of said intermediate recesses, each of said studs having an inner recess for the head of one of said bolts, each of said bolts having a spring urging the bolt out of locking engagement with its corresponding stud.

4. Attachment means for a device having cover and casing sections, said means comprising an array of brackets inside of and secured to said cover section, each of said brackets having an outer bore, a cam bolt for each bracket, each cam bolt having a threaded shank slidable in the bore of its bracket for radial movement with the shank of the bolt out, a lock nut for each of said shanks, each of said brackets having an outer recess for one of said lock nuts and also having an intermediate recess, cam studs fixed to and extending lengthwise of said casing section and each fitting one of said intermediate recesses, each of said studs having an inner recess for the head of one of said bolts, each of said bolts having a non-circular stem inwardly projecting from the bolt head, a non-circular support on each bracket for one of said stems, and a spring for each of said stems for urging each of said bolts inwardly out of locking engagement with its stud.

5. In a device having circular sections having an axis and fitting together, means for attaching said sections, said means comprising a circular array of studs each having an inwardly facing conical surface conjoining a bifurcation, one of said sections having an end wall portion extending in a direction across the axis, means securing each of said studs so that they project outwardly from said end wall with the axis of each conical surface radial of the axis, a corresponding array of sliding cam bolts, means secured to the other section supporting each of said bolts for sliding non-rotary movement of the bolt inside of said other section, said supporting means having an array of apertures lengthwise of said axis in each of which fits one of said studs, said supporting means also having a recess inwardly of each of said lengthwise apertures to house the bolt cam surface out of attaching position, each of said bolts having a shank smaller than said bifurcation and having an outwardly facing conical cam surface fitting said stud conical surface, and a lock nut for said bolt, said other section having an aperture extending inwardly from its outer surface for housing the shank and lock nut of each of said bolts while permitting access thereto from the exterior of said front section.

6. In a device having sections fitting together, means for attaching said sections, said means comprising a stud having an inwardly facing conical surface conjoining a bifurcation, one of said sections having a flange extending in a direction across the end of the section, means securing said stud projecting outwardly of said flange with the axis of said conical surface extending across the end of the section, a sliding cam bolt, said bolt having a shank smaller than said bifurcation and having an outwardly facing conical cam surface fitting said stud conical surface, means secured to the other section supporting said bolt for sliding non-rotary movement of the bolt, said supporting means having an aperture in which said stud fits, said supporting means also having a recess inwardly of said aperture to house the bolt cam surface out of attaching position, and a nut for advancing said bolt to attaching position.

ARTHUR C. CHESTER.